United States Patent [19]

Pypno

[11] 4,139,744
[45] Feb. 13, 1979

[54] REVERSIBLE HAND-HELD MICROPHONE

[75] Inventor: Thaddeus Pypno, Hoffman Estates, Ill.

[73] Assignee: Motorola, Inc., Schaumburg, Ill.

[21] Appl. No.: 841,499

[22] Filed: Oct. 11, 1977

[51] Int. Cl.² ............................................. H04M 1/03
[52] U.S. Cl. ..................................................... 179/167
[58] Field of Search ......................................... 179/167

[56] References Cited
U.S. PATENT DOCUMENTS 3,488,456   1/1970   Maki ..................................... 179/167

Primary Examiner—William C. Cooper
Attorney, Agent, or Firm—Victor Myer; James W. Gillman

[57] ABSTRACT

A microphone assembly is adaptable to righthand or lefthand operation by having a reversibly positionable pushbutton. The microphone housing has two oppositely located apertures for receiving the pushbutton. The aperture not used is covered with a part of a reversibly positionable shroud. The pushbutton is a lever which pivots about a pin and activates a spring loaded leaf spring switch, the switch being operable from two opposite directions by the reversibly positionable pushbutton lever.

9 Claims, 5 Drawing Figures

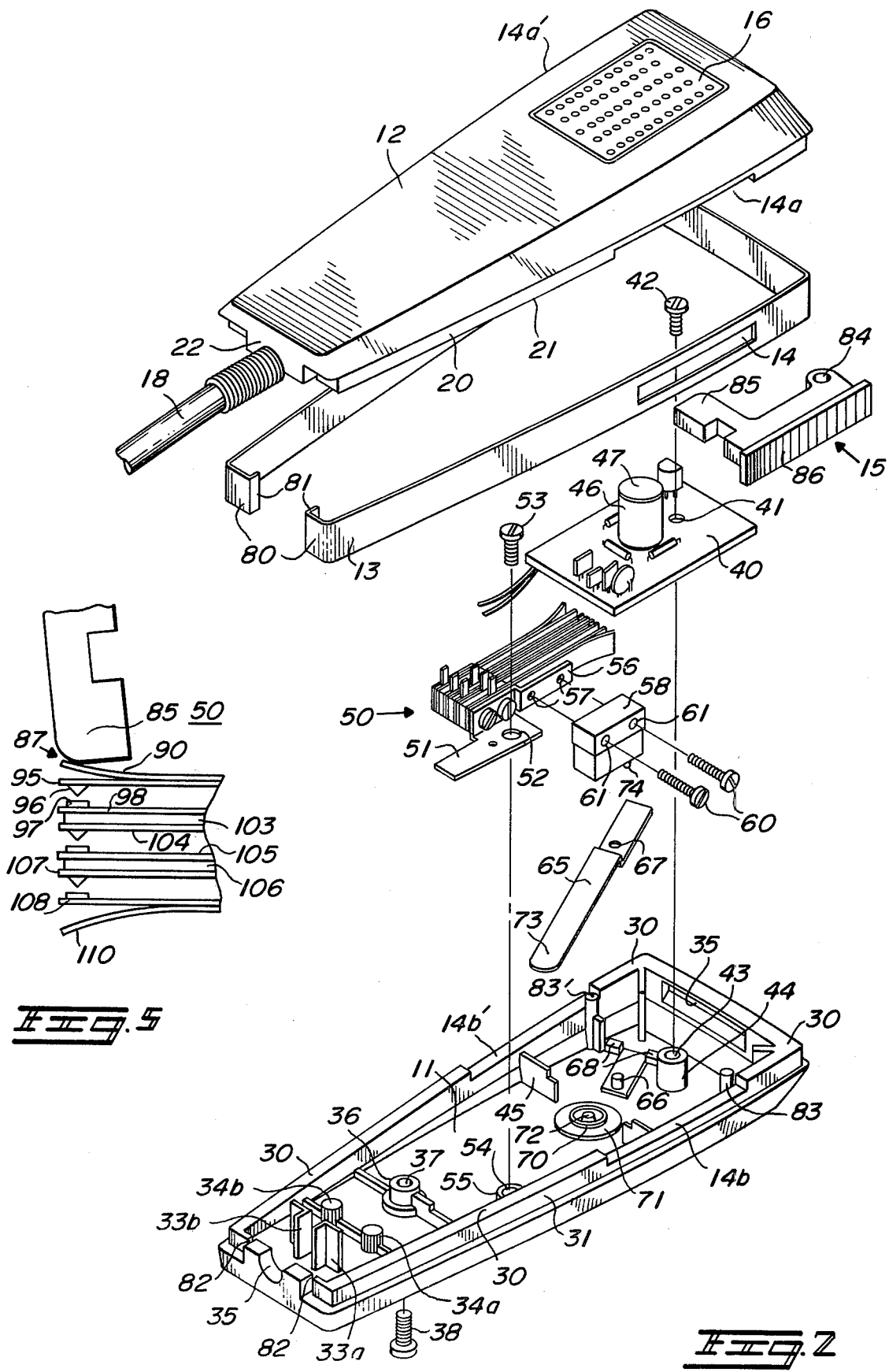

REVERSIBLE HAND-HELD MICROPHONE

BACKGROUND OF THE INVENTION

1. Field of the Invention

This invention relates generally to hand-held microphone assemblies and, more particularly, to a hand-held microphone assembly having a reversibly positionable pushbutton.

2. Description of the Prior Art

Microphones of the prior art, and particularly hand-held microphones, were designed to be operated most conveniently with a particular hand. Most microphones are actuated by having an operator depress a pushbutton which in turn activates some type of switch contained within the microphone. For ease of operation, the pushbutton switch is usually located to one side or the other of the microphone. Location of the microphone pushbutton switch to one side of the other of the unit allows the microphone to be cradled by the fingers and palm of a user's hand to provide a secure grasp around the body of the microphone while allowing the acoustical transducer into which the operator speaks to be easily spoken into. The acoustical transducer generally is placed in the front face of the instrument. Because the pushbutton switch is located on one side or the other of the microphone as the microphone is held in the user's hand, the pushbutton switch is most conveniently operated by either the thumb or the fingers of the operator, depending upon which side of the microphone the pushbutton is placed. When the operator desires to use the opposite hand for operating the microphone it is required to use an opposite arrangement to actuate the microphone, that is, if the thumb actuated the microphone when the microphone was held by the right hand, when the microphone is held in the left hand, the fingers will be required to actuate the microphone. Often in a particular microphone design, the microphone is most conveniently and effectively operated by one hand and not very effectively or conveniently operated by the other hand. Prior art microphones have not been designed to permit changing the pushbutton position from one side to the other. If, for example, a particular equipment utilizing a microphone is ordinarily operated by having the microphone in the right hand, when left hand operation is required, the microphone must be completely replaced by another microphone which is actuable by the left hand. Recognition of the problems arising from not conveniently having interchangable use of a microphone has prompted some compromise solutions. These include having the pushbutton on the front of the microphone, but this results in user fatigue in both holding and operating such devices. In the mobile radio environment, such as, for example, in the driver's position of a law enforcement officer's vehicle, the radio equipment or the control head therefor may be mounted on either side of the vehicle steering wheel. Since microphones have a connection cord attached thereto, having an equipment or control head mounted on one side of the vehicle while operating the microphone in the opposite hand causes obvious difficulties, especially when the officer is required to devote his attention to the vehicle operation. Having to supply microphones of either handedness requires a manufacturer to design and produce two varieties of microphones. In the field, users are often limited to locating equipment on one side of a vehicle with the wrong type of microphone being supplied by the manufacturer. Generally, this provides both the manufacturers and the users of microphones with difficulties. It is apparent that there has been a long felt need in the art for an easily adaptable microphone.

SUMMARY OF THE INVENTION

Accordingly, it is an object of this invention to provide a hand-held microphone assembly which is easily adapted for right hand or left hand operation.

It is another object of this invention to provide a hand-held microphone which permits equipment attached thereto to be conveniently located on either side of an operator.

It is another object of this invention to provide a hand-held microphone which is adapted to be easily field adapted to right hand or left hand actuation as required.

Accordingly, this invention provides a hand-held microphone assembly which is adaptable to right hand or left hand operation.

A reversibly positionable pushbutton member is supported and placed in one of two external openings in a microphone housing. The pushbutton in either position actuates a switch contained within the housing. According to one aspect of the invention a microphone housing includes a base member and a cover member, each having upstanding peripheral flanges contained thereupon. Each member is adapted to be positioned along the top surface of the flanges adjacent to the other member to form the microphone housing. A reversibly positionable shroud is attached to the housing and covers the unused housing aperture while itself providing an aperture for clearance of the pushbutton member. According to another aspect of the invention the pushbutton member is a lever pivotal at one end about a pin with the other end of the lever actuating a spring loaded leaf spring.

BRIEF DESCRIPTION OF THE DRAWING

For a more complete understanding of the invention, reference is made to the drawings in which:

FIG. 2 is an exploded perspective view of the components of a hand-held microphone according to the invention;

FIG. 5 is a more detailed plan view of a portion of the switch contact arrangement for a microphone according to the invention.

DESCRIPTION OF THE PREFERRED EMBODIMENT

Figure 1:
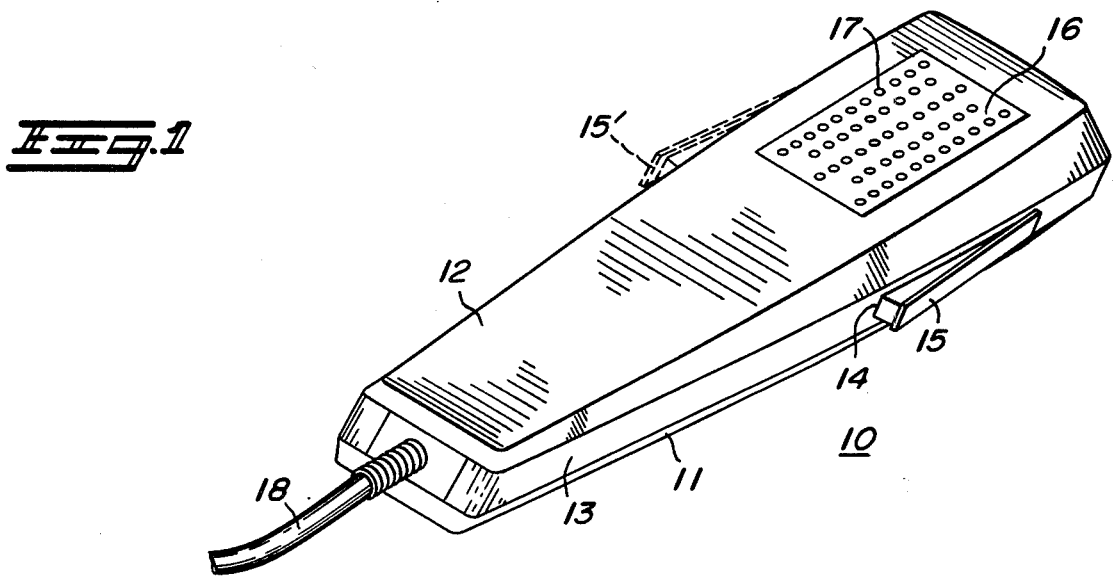
FIG. 1 is a perspective view of a hand-held microphone according to the invention.

Referring to FIG. 1 of the drawing, a hand-held microphone assembly 10 has a housing including a base member 11 and a cover member 12 which are formed by injection molding a suitable polymeric plastic material. Extending around the peripheral surface of the assembly is a decorative shroud formed from a thin strip of material and covering the line formed between the base member 11 and the cover member 12. Contained within the base member and cover member assembly 11, 12 and the shroud 13 is an aperture 14 which permits passage of a portion of a pushbutton lever 15. Shown in dashed lines is an alternatively positioned lever 15' on the side of the housing opposite the lever 15. The lever 15' is shown to indicate that lever 15 is reversibly positionable in an alternative location within the microphone assembly. A screen portion 16 of the cover member 12 has a plurality of holes typically shown at 17; behind the screen 16 is located the acoustical transducer means. A connection cord assembly 18 extends from the bottom of the microphone assembly 10 and provides electrical connection to the circuitry contained within the microphone assembly.

In operation, the hand-held microphone assembly 10 is held by the user's palm and fingers surrounding the lower half of the assembly with the screen 16 available for the user to speak into. Assuming for purposes of description that the microphone is held in the user's right hand, the lever 15 is actuated by the operator pressing on the lever 15 with his thumb. Alternatively, the lever 15' is pressed by the finger, or fingers, of the user. When using a particular hand for actuating the microphone, a given user may be most comfortable using the pushbutton lever 15, or alternatively 15'. In operation, the user preferably holds the microphone in a particular hand and activates the pushbutton lever 15, or the alternatively placed lever 15', by his choice of either thumb or finger pressure.

Referring to FIG. 2 of the drawing the components of the microphone assembly are shown in more detail in an exploded view wherein like elements have the same reference designation numerals as in FIG. 1 of the drawing. The cover member 12 has a flange 20 projecting downward as shown in the drawing. The flange 20 has a top surface 21 around most of the flange except for those parts of the flange which form the connector cord assembly 18 strain relief portion 22 and the apertures 14a, 14'a (not shown, but similar to 14a). Corresponding to the top surface of the cover member peripheral flange is a corresponding top surface 30 on a base member 11 peripheral flange 31 which also has corresponding apertures 14b, 14'b which match the corresponding parts of the cover member 12. These corresponding surfaces permit the juxtaposition of the cover member 12 and the base member 11. Strain relief for the connector cord assembly 18 are provided by an exterior aperture 32 contained within the base member 11, cord guide members 33a, 33b and a pair of toothed guide posts 34a, 34b around which the rubber covered connection cord assembly 18 is positioned to provide strain relief for the cord. A hook member (not shown) is also molded into the cover member 12 which engages a corresponding lip 35 in the base member 11 for fastening the corresponding ends of the base member and the cover member together. A boss 36 in the base member 11 contains an aperture 37 which allows for the passage of a screw 38 which threads into an aperture in a boss (not shown) in the cover member 12. The base member 11 and the cover member 12 are thus fastened together along the top surfaces 30, 21 by means of the hook and lip 35 and the screw 38.

A circuit board 40 contains an aperture 41 for receiving a screw 42 which threads into an aperture 43 in a boss 44 which is molded into the base member 11. The circuit board 40 is supported in the base 11 by a rib member 45. The circuit board 40 has various electrical components attached thereto and is connected by printed wiring to form a circuit providing for amplification of the electrical signal received from an acoustic transducer 46 also mounted on the circuit board. The top end 47 of the acoustic transducer, when all the elements of the microphone are assembled, is positioned behind the screen 16 at which a user directs his speech signals.

A leaf switch assembly 50 includes a metal bracket 51 having an aperture 52 therein. The bracket 52 is fastened to the base member 11 by having a screw 53 pass through the aperture 52 and thread into an aperture 54 contained in a boss 55 on the base 11. Attached to a projecting portion 56 of the bracket 52 which has threaded apertures 57 contained therein is a microswitch 58 which is attached by means of screws 60 which pass through apertures 61 of the micro switch.

A somewhat resilient lever 65 is heat staked to the base member 11 by having a post 66 attached to the base 11 pass through a hole 67 in the lever. The top of the post is deformed by heat to hold the lever to the base. The projections 68 of the base 11 prevent the lever from pivoting about the post 66. The lever 65 passes over the bottom portion of a microphone hang-up button 70, said microphone hang-up button being attached to the base member by having a portion thereof rolled over a washer 71. Axially contained within the microphone hang-up button 70 is a spring loaded plunger 72, the end of which bears against the bottom surface of the lever 65. When the micro switch 58 and the lever 65 are assembled into position, the end 73 of the top surface of the lever bears against an actuating pushbutton 74 at the bottom of the microswitch 58. The plunger 72 moves axially into the microphone assembly in response to the microphone, for example, being placed in a hang-up bracket (not shown). This axial movement of the plunger 72 causes the lever 65 to be pushed upwardly with the result that the top surface of the end 73 of the lever pushes against the microswitch pushbutton 74 to activates the microswitch 58. The microswitch 58 is utilized to provide, for example, selective activation of predetermined radio equipment in response to, for example, predetermined tone frequencies. This permits many users to share the same radio frequency channel with individual users being identified by a particular tone frequency.

A shroud 13 is shown in FIG. 2, said shroud being formed from a thin strip of stainless steel. An aperture 14 having a long rectangular shape is included in one side wall thereof. The ends 80 are formed to have projections approximately at right angles to the sides of the shroud 13. The projections have tabs 81 at right angles to the ends and extend inwardly. When assembled to the base member 11 and the cover member 12, the shroud 13 fits against the outer surface of the flanges 20, 31 and is slightly recessed within the unit formed by the base member 11 and the cover member 12 because the flanges 20, 31 are positioned slightly away from the edges of the cover and base members. The tabs 81 of the shroud are contained within slots 82 located near the connector cord end of the microphone assembly. When assembled, the base member and cover member hold the shroud in position within the recess extending around the housing.

Posts 83 and 83' located on the base member 11 near the apertures 14b, 14'b respectively serve as pivot pins for the pushbutton lever 15, an aperture 84 at one end of which engages a post end. The other end of the lever 15 has a projection 85 which when assembled projects inside the microphone assembly for activating the leaf switch assembly 50. In operation, the pushbutton lever 15 is actuated by an operator applying force against the external surface 86 thereof.

Figure 3:
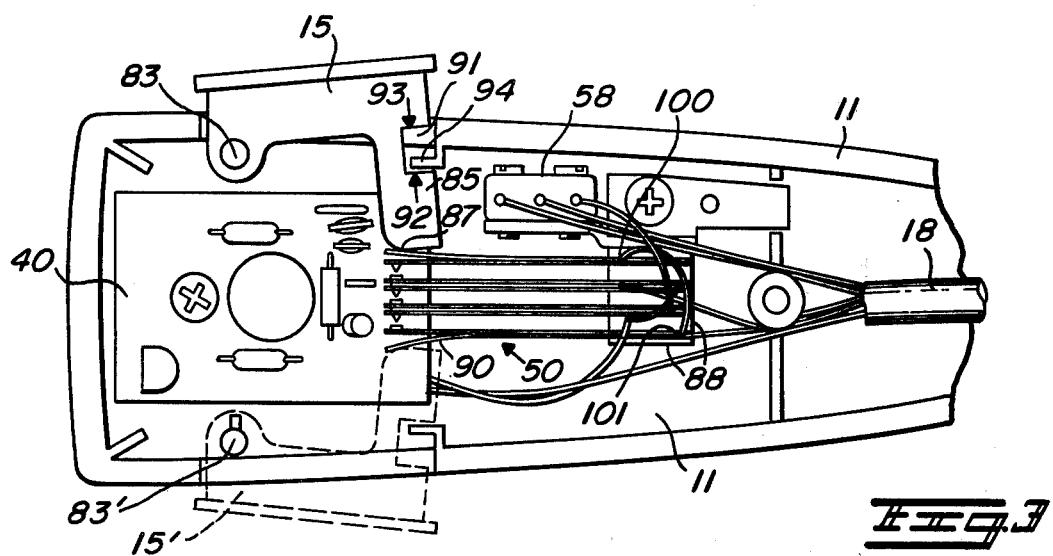
FIG. 3 is a plan view of a partial assembly of a hand-held microphone according to the invention.

Referring now to FIG. 3 of the drawing, the pushbutton lever 15 is shown assembled to the base member 11. The alternative pushbutton lever 15' is shown in position on the opposite side of the microphone assembly. The pushbutton lever 15 pivots about the post 83 when pushed by an operator. The leaf switch 50 has connected thereto various wires from the printed circuit board 40, the microswitch 58, and the connection cord assembly 18, as required for a particular operating system. The leaf switch assembly 50 is shown having contact points which are progressively closed by an end 87 of the projecting portion of the pushbutton lever. The leaf switch assembly 50 includes elongated thin members spaced apart by insulating blocks 88 at the end where the wire connections are made. FIG. 5 shows in greater detail the contact portions of the leaf switch assembly 50.

A leaf spring 90 is provided as part of the switch assembly to bias the pushbutton lever 15 away from the switch. Referring to FIG. 3 of the drawing the pushbutton lever projecting portion 85 has a cut-out 91 therein, one surface 92 of which provides a stop against a projecting portion 94 of the base 11 when the pushbutton lever 15 is biased outwardly by the leaf spring 90. Another surface 93 of the projecting portion 85 of the pushbutton lever 15 provides a stop against the projection 94 when the pushbutton lever 15 is pushed inwardly while being actuated by an operator. Referring now to FIG. 5, the inwardly directed motion of the projecting portion 85 of the pushbutton lever 15 causes the leaf spring 90 to bear against a leaf member 95. The leaf member 95 has at one end a contact 96 which when the member 95 is pushed by the spring 90 bears against another contact 97 which is also affixed to the end of another leaf member 98. By this means, the terminal 100, as shown in FIG. 3, is connected to the terminal 101. A flexible insulator 103 is provided between leaf member 98 and another leaf member 104 which together with a leaf member 105 performs the same function as elements 95 and 98. Similarly, another flexible insulator 106 separates leaf member 105 from a leaf member 107 which is paired with a leaf member 108. Another leaf spring 110 is provided at the opposite side of the leaf spring assembly 50 and provides a biasing force for the pushbutton 15' which alternatively is located on the opposite side of the microphone assembly.

Figure 4:
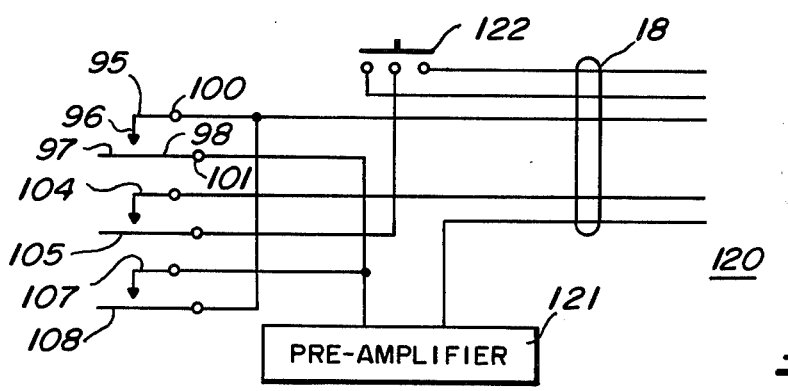
FIG. 4 is a circuit diagram of the electrical connections for a hand-held microphone according to the invention.

Referring to FIG. 4 of the drawing, a wiring diagram 120 for the embodiment described hereinabove is shown, wherein like numerals are used for like elements. Note that the outermost leaf members 95 and 108 are electrically connected together as well as the mating leaf members therefor 107, 98. These switch contacts are wired in parallel so that the pushbutton lever is required to be depressed only to the extent that only two pairs of contact are required to be engaged, whether the pushbutton lever 15 is on one side or the other. The preamplifier 121 corresponds to the circuitry contained on the circuit board 40. The switch 122 corresponds to the micro switch 58.

It can readily be seen that while in the field, a microphone assembly as described hereinabove can be readily converted from right hand to left hand operation by removing the screw 38, reversing the position of lever 15, and refastening the screw 38.

While a particular embodiment of the present invention has been shown and described, it should be understood that the invention is not limited thereto since many modifications may be made. It is contemplated to cover by the present application any and all such modifications that fall within the true spirit and scope of the basic underlying principles disclosed and claimed herein.

I claim:

1. A hand-held microphone assembly comprising:
    a reversibly positionable actuator member;
    a microphone housing having two external openings contained therein, said external openings providing clearance for the actuator member;
    means for supporting the actuator member in position in one of the housing external openings;
    a switch fixedly disposed within the housing; means for actuating said switch from either of two locations, one of said two locations corresponding to one of said two external openings and the other one of said two locations corresponding to the other one of said two openings; and
    said switch activating means being engageable by said actuator member from either of said two locations.

2. The microphone assembly of claim 1 wherein the microphone housing includes a base member having an upstanding peripheral flange with a terminating surface thereon and a cover member having an upstanding peripheral flange with a terminating surface thereon, said base member and said cover member being adapted to be juxtapositioned along the terminating surfaces of the flanges.

3. The microphone assembly of claim 2 including an external reversibly positionable shroud attached to the housing and covering adjacently positioned portions of the flange, said shroud having an aperture providing clearance for the actuator member, the other of the two external openings of the housing being covered by a portion of the shroud.

4. The microphone assembly of claim 1 wherein the support means includes two pins each predeterminedly located with respect to the housing external openings, and wherein the actuator is a member pivotable about either of the pins.

5. The microphone assembly of claim 1 wherein said switch activating means includes means for biasing the actuator member away from the switch.

6. The microphone assembly of claim 5 wherein the means for biasing the actuator includes a leaf spring.

7. The microphone assembly of claim 1 wherein the switch is a leaf switch.

8. The microphone assembly of claim 7 wherein the leaf switch has a plurality of contacts arranged to be progressively closed by the actuator.

9. A hand-held microphone of the same actuated by a spring-biased pushbutton, said microphone comprising:
    a pivotable, reversible pushbutton member having a lever portion with a pivot hole located near a first end thereof, said pivot hole having an axis, said pushbutton member having an operator-actuated pushing surface along one side of said lever, said pushbutton member having a switch bearing surface at the end of a projection extending from a second end of the lever portion;
    a housing having apertures on opposite sides thereof, said apertures adapted to accept the pushbutton therein to configure the microphone for either left-hand or right-hand operation;
    a reversible shroud having an aperture therein, said shroud being attached to the housing with the pushbutton projecting through the aperture, a portion of said shroud covering portions of the housing and the unused housing aperture;

pivot pins located near the housing apertures for engaging the pushbutton lever hole and for supporting the pushbutton;

a leaf spring switch attached to the housing having leaf spring members on opposite sides thereof and having a plurality of spaced apart leaf members with contacts thereon, said switch actuated by the pushbutton switch bearing surface causing the leaf members to be pushed together.

* * * * *